US006754744B2

(12) United States Patent
Kim et al.

(10) Patent No.: US 6,754,744 B2
(45) Date of Patent: Jun. 22, 2004

(54) BALANCED LINKED LISTS FOR HIGH PERFORMANCE DATA BUFFERS IN A NETWORK DEVICE

(75) Inventors: Hyung Won Kim, San Jose, CA (US); Dennis S. Lee, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 56 days.

(21) Appl. No.: 10/237,612

(22) Filed: Sep. 10, 2002

(65) Prior Publication Data

US 2004/0049613 A1 Mar. 11, 2004

(51) Int. Cl.[7] .............................................. G06F 5/06
(52) U.S. Cl. .......................................... 710/56; 710/52
(58) Field of Search ...................... 710/52, 56; 320/413, 320/417, 395; 712/225

(56) References Cited

U.S. PATENT DOCUMENTS

| | | | |
|---|---|---|---|
| 5,278,789 A | | 1/1994 | Inoue et al. |
| 5,423,015 A | | 6/1995 | Chung |
| 5,644,784 A | | 7/1997 | Peek |
| 5,802,052 A | * | 9/1998 | Venkataraman ........ 370/395.72 |
| 5,889,985 A | * | 3/1999 | Babaian et al. ............ 712/225 |
| 5,918,074 A | | 6/1999 | Wright et al. |
| 5,987,507 A | | 11/1999 | Creedon et al. |
| 6,061,351 A | | 5/2000 | Erimli et al. |
| 6,088,745 A | * | 7/2000 | Bertagna et al. ............. 710/56 |
| 6,289,013 B1 | | 9/2001 | Lakshman et al. |
| 6,504,846 B1 | * | 1/2003 | Yu et al. ...................... 370/412 |
| 6,574,231 B1 | * | 6/2003 | Leung ......................... 370/412 |
| 6,618,390 B1 | * | 9/2003 | Erimli et al. ............... 370/412 |

OTHER PUBLICATIONS

Yu–sheng Lin and C. Bernard Shung, "Queue Management for Shared Buffer and Shared Multi–Buffer ATM Switches," Department of Electronics Engineering & Institute of Electronics National Chiao Tung University, Hsinchu, Taiwan, R.O.C., XP 000621335, 1996 IEEE, pp 688–695.

* cited by examiner

Primary Examiner—Jeffrey Gaffin
Assistant Examiner—Joshua D Schneider
(74) Attorney, Agent, or Firm—Squire, Sanders & Dempsey L.L.P.

(57) ABSTRACT

A process of handling packet data in a packet buffer is disclosed. Free pointers are stored in a plurality of free pointer queues, with each of the plurality free pointer queues in a form of a linked list and the free pointers are retrieved from each of the plurality of free pointer queues and storing in a prefetch memory to provide a throughput of one free pointer per clock cycle. When an initial portion of a data packet is received, two free pointers are retrieved from the prefetch memory. One of the two free pointers is stored in a start pointer register connoting a start of the data packet and one free pointer is supplied for data elements of the data packet. One free pointer per middle data element is supplied, while no new pointer is needed for the end of packet data element. The start of the data packet is linked with an end of packet portion of a previously received packet in an output queue memory and a data element is read out of the data packet from the output queue memory when selected by a transmission scheduler and releasing a pointer of the data element to one of the plurality of free pointer queues in a way that balances the lengths of all free pointer queues. Additionally, all pointers of a packet are released to one of the plurality of free pointer queues within one cycle when the packet is dropped.

28 Claims, 4 Drawing Sheets

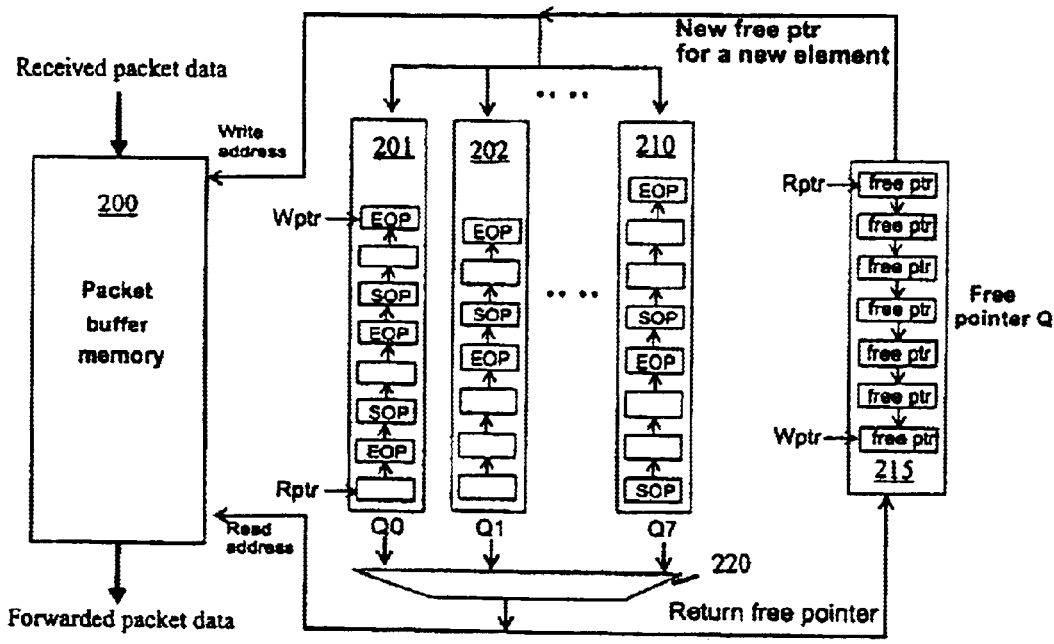
Fig. 2a
(Prior Art)
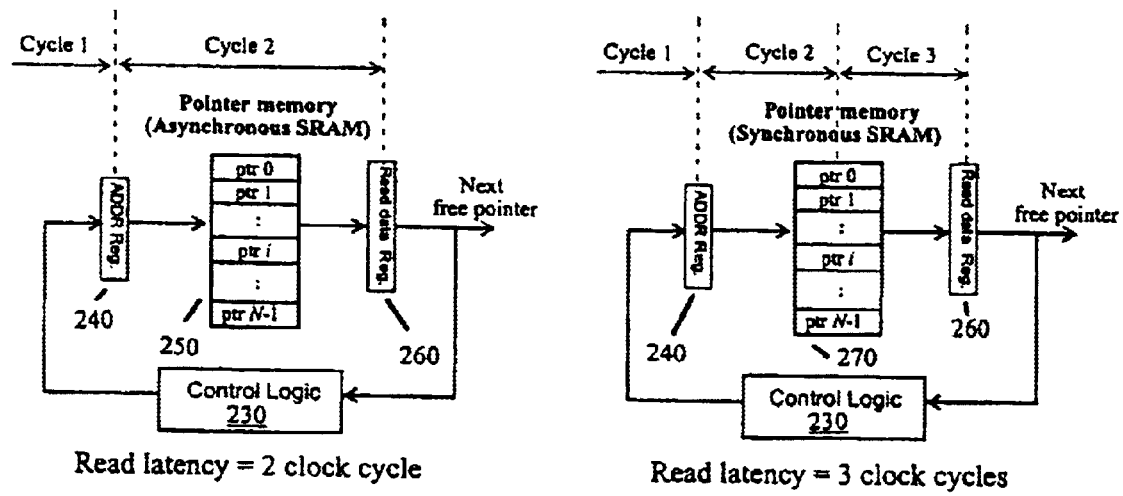
Fig. 2b
(Prior Art)
Fig. 2c
(Prior Art)

BALANCED LINKED LISTS FOR HIGH PERFORMANCE DATA BUFFERS IN A NETWORK DEVICE

BACKGROUND OF THE INVENTION

1. Field of the Invention

The present invention relates to network devices that allow for data to be routed and moved in data communication or computer networks. More specifically, the present invention provides for a packet buffer implemented through balanced linked lists that allow for high performance and a method of using such a packet buffer to maximize the utilization of the data storage memory.

2. Description of Related Art

As computer performance has increased in recent years, the demands on data communication and computer networks has significantly increased; faster computer processors and higher memory capabilities need networks with high bandwidth capabilities to enable high speed transfer of significant amounts of data. One aspect of the network devices used in computer networks is the temporary storage and retrieval of information passing through the network. Such data storage mechanisms are used in network switches or routers, packet or frame processing devices, or network traffic management devices. Most of these applications require large data storage memories that are implemented in semiconductor devices. These memories are often operated as a data queue, which store and forward in the order that data comes into the device.

A simple but widely employed mechanism of storing data packets in a queue is to use a First-In First-Out (FIFO), which can be implemented using a Static Random-Access Memory (SRAM) with a set of read and write address pointers. Such a structure 100 is illustrated in FIG. 1a. An advantage of using a FIFO is its easy manipulation of writing, reading, deleting a sequence of data to or from the memory. However, when many types of packet data have to be stored in a single structure, that can impede the ability to store and retrieve that data effectively.

In many communications devices, different data packets have different requirements of quality of service (QoS) or class of service (CoS). In other words, the different data packets need to be stored in different queues, and forwarded by different scheduling methods to meet their required bandwidth or latency. Such a system is illustrated in FIG. 1b. Packet data is received and stored in the input FIFOs 101–110. The packet data is transferred 120 to output FIFOs 121–130 based on data contained in the packet data and eventually sent out 140 to their forwarding destinations.

When a large number queues is required, the FIFO based mechanism partitions the memory or uses a separate memory for each queue (Q). In the case of network devices, data packets having different destination ports should to be stored in different locations; thus the number of queues required is often the number of destination ports times the number of CoS queues in addition to the number of source ports or source channels. In such applications, the FIFO-based packet memories are very inefficient in their memory utilization, because each queue tends to be very small. Often times, a queue can overflow even if there is plenty of space available in other queues.

To avoid the problem of small queue size or low utilization of memory, a more complex mechanism, a linked list, is often employed. An embodiment of a linked list system is illustrated in FIG. 2a. An advantage of linked lists over FIFOs is that it allows one queue to occupy the entire memory by allowing all the queues to share a single memory 200. A linked list 201–210 stores a data packet in a sequence of memory elements, where each element stores a data portion of a fixed size, and all the elements are linked sequentially by means of pointers. The addresses or pointers of all the memory elements are initially stored in a linked list called a Free Pointer Queue (FreeQ) 215. Each free or unused pointer is used one at a time to form a linked list of a packet by storing each portion of a data packet to the memory element pointed by its pointer. When the data packet is forwarded, its memory elements are read out from the memory one at a time in the order the element is linked up in the linked list 220, and the pointers of the elements are freed and returned to the FreeQ.

One of the drawbacks of linked list mechanisms, however, is a long delay between accesses of two consecutive elements of a linked list. This drawback often prevents high-performance packet buffer designs from using linked list mechanisms. Every time storing a new element of a packet data, they retrieve each free pointer from the free Q. This is shown schematically in FIG. 2b, where a control logic circuit 230 is used to access an address register 240 to read from a pointer memory 250 configured in an asynchronous SRAM. The pointer obtained from the pointer memory is used as the address for reading the next pointer in the memory 250, where the access is recorded in the read data register 260.

If they need to store more than one new element of a packet data, however, it takes them a certain memory read access time after retrieving one free pointer before the next free pointer can be retrieved. This is shown in FIG. 2b with a read latency of 2 clock cycles. This latency of two cycles leads to a low throughput of one pointer per two clock cycles. This is due to the fact that the address of the next element in a linked list is the contents of the previous element of the linked list, so the next element cannot be retrieved until the previous element is completely read out from the memory and goes through certain analyses and processes. The read latency is usually two or more clock cycles due to the following fact. Most high-performance pipelined designs require input registers and output pipeline registers of memories for timing and testing purposes. Also high speed synchronous SRAMs 270 are increasingly used, which incorporate an internal pipeline register and so require additional clock cycle for read accesses, as shown in FIG. 2c.

When there are input and output registers of a memory, even if the memory allows asynchronous read, which takes less than one clock cycle to read data, the delay between two consecutive read accesses to the free Q is at least two cycles, resulting in a low throughput of pointer memory access. Therefore, conventional linked list mechanisms can receive and properly store only one new element of packet data every two or more clock cycles.

As such, there is a need for a method or mechanism that can be used by a network device to increase the pointer memory throughput. There is also a need for a mechanism or method that maximizes the performance and utilization of the data storage memory.

SUMMARY OF THE INVENTION

It is an object of this invention to overcome the drawbacks of the above-described conventional network devices and methods. The present invention relates to the storing and retrieving of data arriving at a communications device, such as a network switch that directs the flow of that data, and a frame processor that classifies, filters, or modifies the data. More specifically, the architecture and apparatus allows for data frames of any size to be stored in a large number of queues, forwarded to a destination device, or removed from the storage instantly in a way that maximizes the performance and utilization of the data storage memory.

According to one aspect of this invention, a process of handling packet data in a packet buffer is disclosed. When an initial portion of a data packet is received, one or more free pointer is read from a prefetch memory structure in each clock cycle. The one or more free pointer is stored in a start pointer register connoting a start of the data packet. When the last portion of the packet is received, no new free pointer is used, but the first free pointer stored in the start pointer register is linked with an end of packet portion of a previously received packet in an output queue memory. Portions of the data packet are read out, or the entire packet is dropped, from the output queue memory when selected by a transmission scheduler. The more than one free pointer is released to a plurality of free pointer queue memories, wherein the plurality of free pointer queue memories supply free pointers to the prefetch memory structure.

Alternatively, the one or more free pointer can be released to at least one free pointer queue memory of the plurality of free pointer queue memories having a shortest length of free pointers. Also, free pointers can be provided to the prefetch memory structure from the plurality of free pointer queue memories in advance of those pointers being fetched from the prefetch memory structure. The process of providing free pointers to the prefetch memory structure can be performed such that the throughput of the read access to the free pointer queue memories is once every clock cycle of a clock used to maintain the timing of the function of the packet buffer whose read latency is greater than one clock cycle. Additionally, the portions of the data packet may be dropped when the transmission scheduler indicates that the data packet should be dropped and the entire process of releasing the more than one free pointer to a plurality of free pointer queue memories is performed within one cycle. The process may also be performed in a network device that receives, handles and transmits or drops a data packet.

According to another embodiment of this invention, a packet buffer for handling packet data is disclosed. The packet buffer includes receiving means for receiving an initial portion of a data packet, first reading means for reading one or more free pointers from a prefetch memory structure and storing means for storing one of the more than one free pointer in a start pointer register connoting a start of the data packet, configured to store subsequent portions of the data packet until an end of packet portion is reached. The packet buffer also includes linking means for linking the one of the more than one free pointer with an end of packet portion of a previously received packet in an output queue memory, second reading means for reading out portions of the data packet from the output queue memory when selected by a transmission scheduler and releasing means for releasing the more than one free pointer to a plurality of free pointer queue memories. The plurality of free pointer queue memories are configured to supply more than one free pointers to the prefetch memory.

In another embodiment, a packet buffer for handling packet data is disclosed. The buffer includes a plurality of free pointer queue memories, configured to supply more than one free pointers and a prefetch memory structure, configured to supply one or more free pointer. The buffer also has a plurality of assembly linked lists, configured to store one of the more than one free pointer in a start pointer register connoting a start of the data packet, and configured to store subsequent portions of the data packet until an end of packet portion is reached and at least one output queue memory; configured to link the first free pointer with an end of packet portion of a previously received packet. The packet buffer is configured to read out portions of the data packet from the output queue memory when selected by a transmission scheduler and to release the more than one free pointer to a plurality of free pointer queue memories.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures:

FIGS. 2a, 2b and 2c show a linked-list based packet buffer, with the overall structure of the packet buffer illustrated in FIG. 2a, and FIGS. 2b and 2c illustrating the read latencies associated with linked list packet buffers having asynchronous and synchronous SRAM pointer memories;

DETAILED DESCRIPTION OF PREFERRED EMBODIMENTS

Figure 1A:
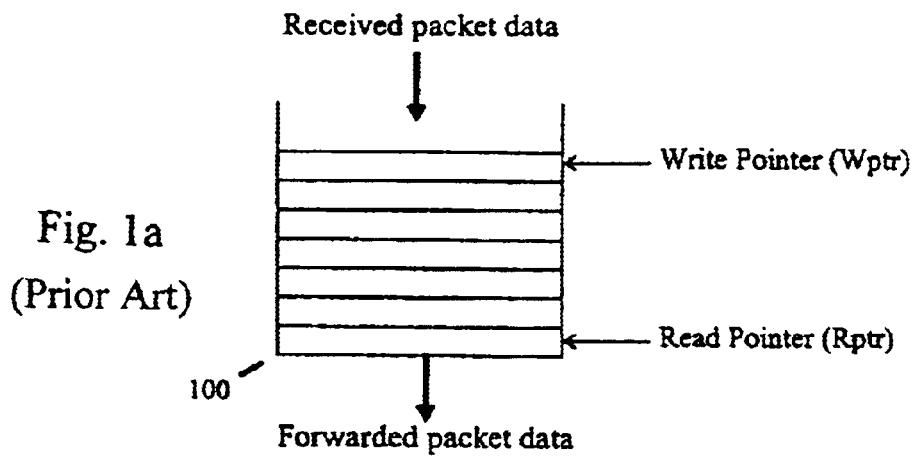
FIGS. 1a and 1b illustrate FIFO-based packet buffers, with FIG. 1a illustrating a single FIFO and FIG. 1b illustrating an embodiment with multiple FIFOs for input and output of packet data.
Figure 1B:
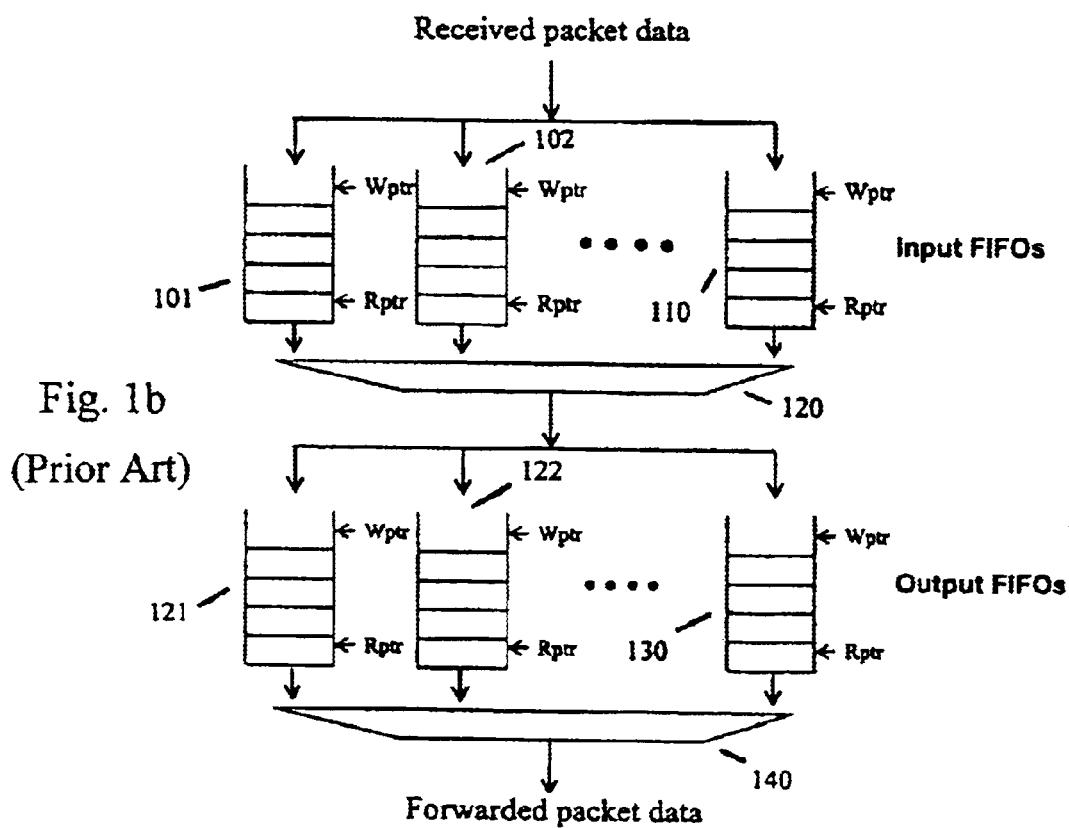

The present invention provides a solution to the problem of traditional linked lists, a low throughput in supplying free pointers to packet data elements, and enables efficient pointer memory utilization and fast process of packet drops. One aspect of the present invention is to employ at least two independent free pointer linked lists, whose lengths are balanced, to store free pointers. In certain embodiments, there are two linked lists and the embodiment is referred to as a dual balanced linked list.

In one embodiment of the present invention, only one pointer memory is used to store free pointer queues, as well as to maintain packet data queues. Having a single pointer memory provides an advantage that reduces the area cost and also makes it possible to drop an entire packet within one cycle as described below. The structure of both free pointer queues, or free queue for short, and the packet data queues are in a form of a linked list; hence a free queue is also referred to as a free pointer linked list in this disclosure. Upon a power-on reset of the device, all the pointers in the pointer memory are configured as free pointers by sequentially linking up the pointers to two or more linked lists as opposed to one linked list in the conventional method. The number of free queues is determined by the latency of retrieving free pointers. In other words, if the latency of one free pointer from the pointer memory is L cycles, L free pointer queues are employed.

No pointer in one free queue equals any pointer in other free queues at any time, so all free queues are always disjoint throughout the operations. Upon the reset, all free pointers in all free queues together cover the entire address range of the pointer memory. All the free queues have the same length right after power-on reset, and are maintained to be as balanced as possible throughout the operation of present invention to maximize the buffer utilization. When retrieving free pointers from the pointer memory, L free pointers are read one per cycle from each of the L free queues in turn, in consecutive L cycles. After L cycles, this process is repeated to read out the next L free pointers. In this way, the throughput of retrieving free pointers is one pointer per cycle, while it is guaranteed that the request of reading a free pointer from the same free queue is L cycles apart to accommodate the read latency of L cycles.

The free pointers are read from the free queues in advance of their actual use, and are temporarily stored in a small storage called a prefetch memory that can be a FIFO structure. The objective of the prefetch memory is to absorb the burstiness of free pointer usage, so as to ensure that the throughput of supplying one free pointer per cycle is sufficient to sustain the usage of free pointers over a period of time. The usage of free pointers varies from two to zero pointers over time, but the overall throughput is one free pointer per cycle.

In one embodiment of the present invention, a Balanced Linked List (BLL) can provide increased throughput of free pointer retrieval to store one new element of packet data every clock cycle. Although a BLL can have more than two Free Pointer Queues (FreeQs), an embodiment of the invention having just two FreeQs is discussed below for the sake of clear presentation.

When reading an element from a packet's linked list, BLL returns the pointer of the element back to one of the two FreeQs, whichever is shorter at the time pointer is returned. BLL keeps track of the lengths of the two FreeQs, and maintains the balance between their lengths by returning pointers to the shorter one. It is important to keep the two FreeQs' length balanced, because if any of the FreeQs becomes empty, the packet buffer cannot store any more data even if the buffer actually has some space left. Therefore, in order to maximally utilize the packet buffer and pointer memory, the BLL keeps the two FreeQs balanced.

In this way, BLL provides a throughput of one read access of pointer memory per cycle, and so can store one element of packet data every cycle. Therefore, it is well suited to high-performance packet buffers.

Figure 3A:
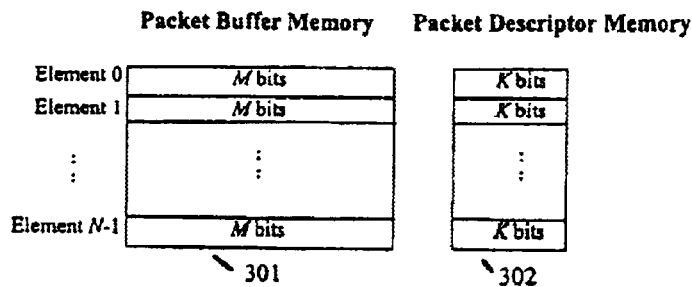
FIGS. 3a, 3b, 3c and 3d illustrate block diagrams of memories and registers for the balanced linked list, with FIG. 3a illustrating the packet buffer memory, FIG. 3b illustrating the assembly linked list registers, FIG. 3c illustrating the output Q registers, and FIG. 3d illustrating the free pointer linked lists and the pointer memory.

FIGS. 3a–3d show block diagrams of memory structures and registers for the balanced dual linked list embodiment. The packet buffer 301 and packet descriptor 302 memories are illustrated in FIG. 3a. Suppose the packet buffer 301 consists of N elements of packet data storage. Then the packet buffer memory contains N entries, each of which corresponds to each packet data element. The packet descriptor memory 302, which also contains N entries, stores control information of packets, such as the packet length, the byte count in the last element, the source and destination port or channel, the destination Q ID, and the quality of service (QoS) for the packet.

Figure 3B:
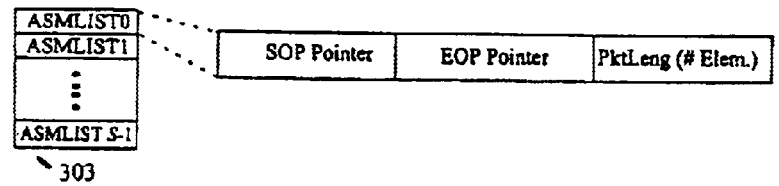

BLL has a number of assembly linked lists (ASMLIST), each of which assembles multiple sequences of data elements to packets at the same time. Thus if there are S ASMLIST, BLL can assemble up to S packets simultaneously. The structure of the assembly linked list registers 303 is illustrated in FIG. 3b. These assembly linked lists 303 can be used for packet assembly of interleaved packets that are received via multiple channels (up to S channels) in the case of channelized interface such as System Packet Interface Level 4 (SPI4), or for packet reception from multiple source ports in the case of multi-port network switches. The register for each assembly linked list consists of SOP (Start Of Packet) pointer, EOP (End Of Packet) pointer, and packet length in terms of number of elements.

Figure 3C:
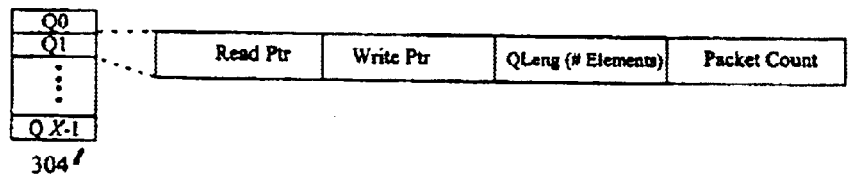

Once a packet is completely assembled from its SOP to EOP, it is linked to the output Q to which the packet is destined. An output Q register 304 is illustrated in FIG. 3c. An output Q can be either class of service Q or destination port output Q, or a combination of both. Each Q, also in the form of a linked list, links up the next packets to their previous packets, while each assembly linked list links up the next elements to their previous elements of one packet. Each Q register 304 contains a read pointer, a write pointer, Q length in terms of number of elements, and packet count.

Figure 3D:
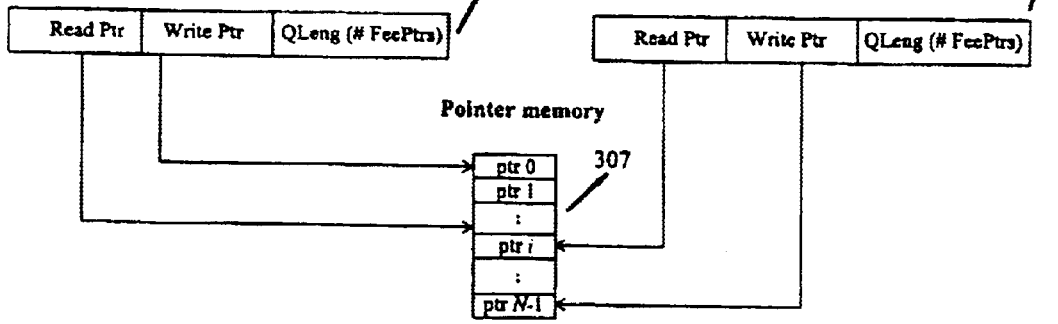

As shown in FIG. 3d, the pointer memory 307 contains all free pointers and the next element pointers of all linked lists. All the free pointers are linked up by two free pointer Qs: FreeQ0 305 and FreeQ1 306 in BLL. Alternatively, conventional linked list mechanisms use only one free pointer Q. Each free pointer Q forms a linked list of free pointers using registers: read pointer, write pointer, and Q length in terms of number of free pointers. Initially the both FreeQ0 305 and FreeQ1 306 are of the same length, or balanced, and their lengths are maintained as balanced as possible.

Figure 4:
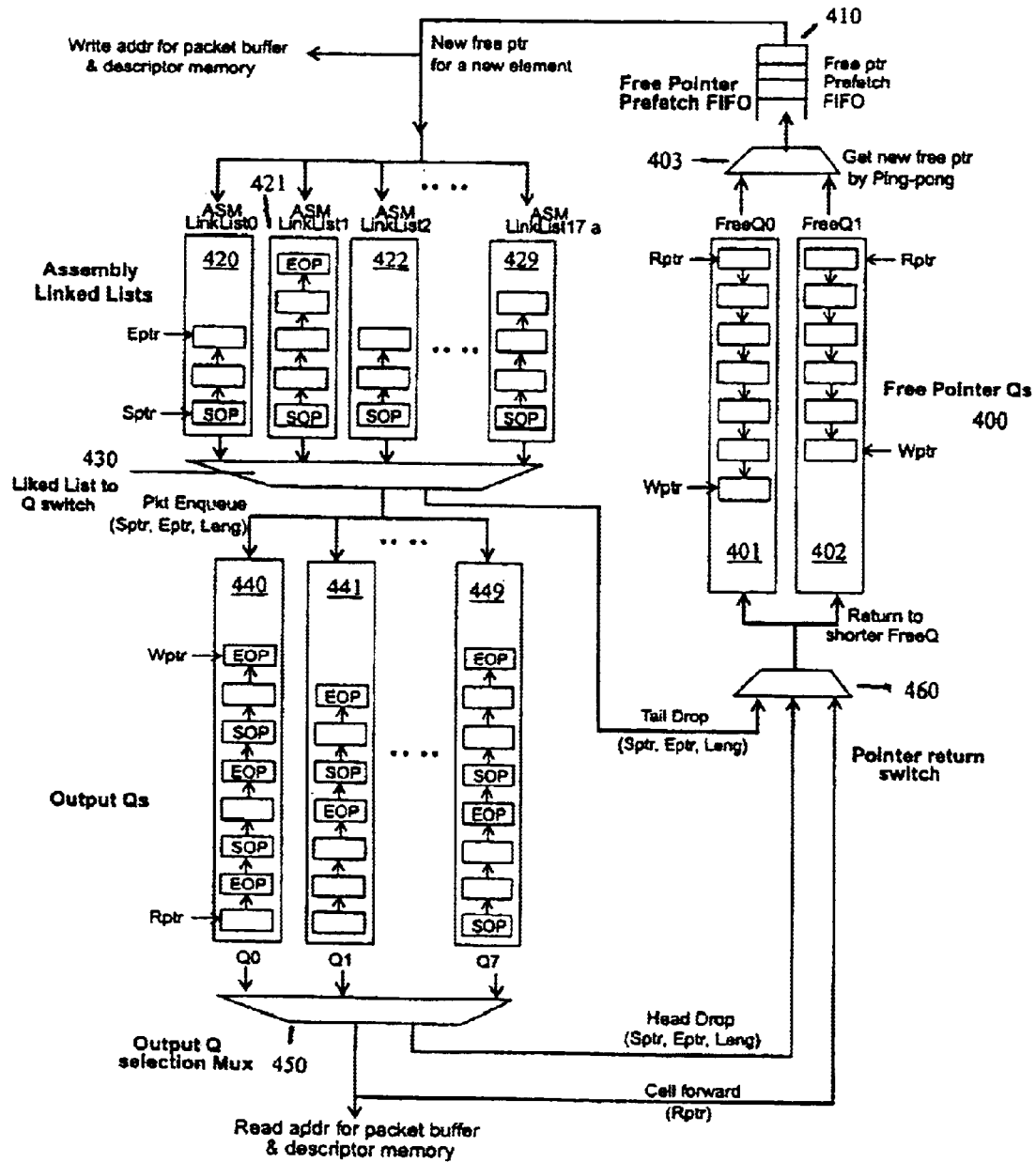
FIG. 4 is a diagram illustrating a dual balanced linked list buffer, according to one embodiment of the present invention, and describes the operations of the dual balanced linked list.

FIG. 4 illustrates the operations of the BLL. For the sake of clear illustration, it is assumed that the output Qs are eight class of service Qs, 440–449, for the same port, and there are eighteen assembly linked lists, 420–429. In the initial state, the 2 free pointer Qs 400 (FreeQ0 401 and FreeQ1 402) form two disjoint linked lists of free element pointers. Let MAXPTR be the maximum address of the packet buffer memory; it is assumed that each address points to one data element in the packet buffer. In this illustration, FreeQ0 401 starts from pointer 0 and ends at pointer MAXPTR/2−1, while FreeQ1 402 starts from pointer MAXPTR/2 and ends at pointer MAXPTR. However, the BLL is not limited to this configuration as far as FreeQ0 and FreeQ1 have the same length.

Free pointers are prefetched 403 from both FreeQs and stored in free pointer prefetch FIFO 410 until they are actually used. In every even cycle (C0, C2, C4, . . . ), a free pointer is retrieved from FreeQ0, while in every odd cycle (C1, C3, C5, . . . ), a free pointer is retrieved from FreeQ1. Hence, the throughput of retrieving a pointer from the same FreeQ is one pointer per cycle, although the latency of retrieving a pointer from the same FreeQ is two cycles. The free pointer prefetch FIFO 410 can store one free pointer in each clock cycle, but it can read out up to two free pointers in each clock cycle.

When each data element of packet is received, it is linked up in the assembly linked list corresponding to its source port or source channel ID. In the example of FIG. 4, it is assumed that there are eighteen linked lists 420–429.

When an SOP (start of packet) element of packet data is received, two free pointers, say FP1 and FP2, are read out from the prefetch FIFO 410 and given to the corresponding assembly linked list, for example ASMLISTk. FP1 is immediately stored in the start pointer register Sptr of ASMLISTk, and FP2 is linked to FP1 by writing FP2 to pointer memory addressed by FP1. This operation takes one write operation of pointer memory. When the next elements of the packet data are received, one free pointer, for example FPi, is moved from the prefetch FIFO 410 to ASMLISTk for each element, and FPi is linked up to the end of ASMLISTk. This process also takes one write operation of pointer memory.

When the EOP (end of packet) element of the packet data is received, no free pointer is retrieved from the prefetch FIFO 410, because the required free pointer had been already linked up to ASMLISTk when the previous element of the packet was received. Instead, at this time, the SOP element of this packet is linked up 430 to the EOP of the previous packet in the destination output Q. Thus processing the pointer for the EOP element also takes one write operation of pointer memory. Therefore, only one write and one read operation to the pointer memory per cycle is needed to process each pointer. In this example, it is assumed there are eight output Qs 440–449.

The way packets are linked up is that SOP element is linked up to the previous packet's EOP element, thus a single pointer memory is sufficient to keep track of packet-to-packet links in each Q as well as element-to-element links in the assembly linked lists. The present linked list architecture, which is based on single pointer memory, enables the process of packet drops to be completed within one clock cycle as described later.

When a packet is to be forwarded, a transmission scheduler selects which Q to read packets from. Elements of packets in the selected Q are read out 450, and at the same time, their pointers are released and returned to the free pointer Qs 400, one at a time. Each released pointer is returned to the shorter FreeQ, so the lengths of the two FreeQs are maintained as balanced.

If the transmission scheduler determines to drop the packet in a Q, the entire linked list of the packet is returned to the shorter FreeQ instantly by linking up the SOP element of the packet to the write pointer Wptr of the shorter FreeQ and assigning the EOP pointer of the packet to Wptr. This is possible due to the fact that the present invention uses a single pointer memory where both free pointers and data element pointers reside together. In the conventional method, where the data element pointers reside in a separate pointer memory, in contrast, all the pointers from the data element pointer memory must be released one at a time to the free pointer memory, so dropping a long packet can take hundreds of cycles, halting the process of newly received packets for a long time.

In the present invention, if the dropped packet includes more than one element, the two FreeQs 400 may have different length for a brief period of time, but soon come to have the balanced length as all the pointers get returned to shorter FreeQ. Whenever the length of the prefetch FIFO 410 goes below a specified threshold, free pointers are moved from the FreeQs 400 to the prefetch FIFO 410.

In the above description, it was assumed that the read latency of the pointer memory is two clock cycles, so that two FreeQs are employed. However, if the read latency of pointer memory is L, the same performance and utilization of linked list based packet buffer storage can be achieved by employing L FreeQs and maintaining their lengths balanced.

In summary, a BLL (Balanced Linked List) employs two or more disjoint free pointer Qs, whose lengths are maintained balanced, to increase the throughput of reading pointer memory to one pointer per clock cycle. This allows the packet buffer storage system to store each element of packet data every clock cycle, whereas conventional linked list architectures can store each element of packet data every two or more clock cycles. Therefore, BLL is well suited to high-performance packet buffers.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

In addition, while the term packet has been used in the description of the present invention, the invention has import to many types of network data. For purposes of this invention, the term packet includes packet, cell, frame, datagram, bridge protocol data unit packet, and packet data.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A process of handling packet data in a packet buffer, said process comprising:

storing free pointers in a plurality of free pointer queues, with each of said plurality free pointer queues in a form of a linked list;

retrieving free pointers from each of the plurality of free pointer queues and storing in a prefetch memory to provide a throughput of at least one free pointer per clock cycle;

receiving a data packet;

retrieving two free pointers from the prefetch memory;

storing a first free pointer of said two free pointers in a start pointer register connoting a start of the data packet and storing a second free pointer of said two free pointers in an assembly linked list;

supplying one free pointer for each middle data element of the data packet, until an end of packet portion is reached;

linking said start of the data packet with an end of packet portion of a previously received packet in an output queue memory;

reading out a data element of said data packet from said output queue memory when selected by a transmission scheduler and releasing a pointer of the data element to one of said plurality of free pointer queues; and releasing all pointers of a packet to one of said plurality of free pointer queues within one cycle when the packet is dropped;

wherein said all free pointers linking free queues and all pointers linking data elements reside in at least one pointer memory.

2. A process as recited in claim 1, wherein said step of storing free pointers in a plurality of free pointer queues comprises assigning each free pointer to one of a plurality of equal-length free pointer queues such that, upon a power-on reset, no free pointer of said free pointers is assigned to more than one of said plurality of equal-length free pointer queues, and an entire address range of the at least one pointer memory is covered by the free pointers in said plurality of all the free pointer queues.

3. A process as recited in claim 1, wherein said step of linking said start of the data packet with an end of packet portion of a previously received packet is performed without any new free pointer being retrieved.

4. A process as recited in claim 1, wherein said step of retrieving free pointers from each of the plurality of free pointer queues comprises retrieving free pointers in advance of their actual use and keeping the free pointers in reserve in the prefetech memory to even out free pointer usage.

5. A process as recited in claim 1, wherein said step of supplying one free pointer for data elements of the data packet is performed to maintain write access to the at least one pointer memory to at most one access per clock cycle.

6. A process as recited in claim 1, wherein said step of releasing all pointers of a packet to one of said plurality of free pointer queues comprises releasing all pointers of a packet to one of said plurality of free pointer queues having a shortest length.

7. A process as recited in claim 1, further comprising providing free pointers from the prefetch memory to received data packet elements by reading up to two free pointers from the prefetch memory in each clock cycle.

8. A process as recited in claim 7, wherein said step of providing free pointers to the prefetch memory structure is performed whereby the throughput of read access to the free pointer queue memories is at least once every clock cycle even when the latency of the at least one pointer memory is greater than one clock.

9. A Process as recited in claim 8, wherein said step of providing free pointers to the prefetch memory structure is performed such that a throughput of read access is maintained by reading each free pointer once per cycle from the plurality of free pointer queues in consecutive cycles.

10. A Process as recited in claim 8, wherein a total number of said plurality of free pointer queues is not less than a number of cycles of the latency of the at least one pointer memory.

11. A process of handling packet data in a network device, said process comprising:
  storing free pointers in a plurality of free pointer queues, with each of said plurality free pointer queues in a form of a linked list;
  retrieving free pointers from each of the plurality of free pointer queues and storing in a prefetch memory to provide a throughput of at least one free pointer per clock cycle;
  receiving a data packet at a port in communication with a port interface;
  retrieving two free pointers from the prefetch memory;
  storing one of said two free pointers in a start pointer register connoting a start of the data packet and storing a second free pointer of said two free pointers in an assembly linked list;
  supplying one free pointer for each middle data element of the data packet, until an end of packet portion is reached;
  linking said start of the data packet with an end of packet portion of a previously received packet in an output queue memory;
  reading out a data element of said data packet from said output queue memory when selected by a transmission scheduler and releasing a pointer of the data element to one of said plurality of free pointer queues;
  transmitting the data packet to a destination port of the port interface or dropping the data packet; and
  releasing all pointers of a packet to one of said plurality of free pointer queues within one cycle when the packet is dropped;
  wherein said all free pointers linking free queues and all pointers linking data elements reside in at least one pointer memory.

12. A packet buffer for handling packet data, said packet buffer comprising:
  first storing means for storing free pointers in a plurality of free pointer queues, with each of said plurality free pointer queues in a form of a linked list;
  first retrieving means for retrieving free pointers from each of the plurality of free pointer queues and storing in a prefetch memory to provide a throughput of at least one free pointer per clock cycle;
  receiving means for receiving a data packet;
  second retrieving means for retrieving two free pointers from the prefetch memory;
  second storing means for storing a first free pointer of said two free pointers in a start pointer register connoting a start of the data packet and for storing a second free pointer of said two free pointers in an assembly linked list;
  supplying means for supplying one free pointer for each middle data element of the data packet, until an end of packet portion is reached;
  linking means for linking said start of the data packet with an end of packet portion of a previously received packet in an output queue memory;
  reading means for reading out a data element of said data packet from said output queue memory when selected by a transmission scheduler and releasing a pointer of the data element to one of said plurality of free pointer queues; and
  releasing means for releasing all pointers of a packet to one of said plurality of free pointer queues within one cycle when the packet is dropped;
  wherein said all free pointers linking free queues and all pointers linking data elements reside in at least one pointer memory.

13. A packet buffer as recited in claim 12, wherein said first storing means comprises assigning means for assigning each free pointer to one of a plurality of equal-length free pointer queues such that, upon a power-on reset, no free pointer of said free pointers is assigned to more than one of said plurality of equal-length free pointer queues, and an entire address range of the at least one pointer memory is covered by the free pointers in said plurality of all free pointer queues.

14. A packet buffer as recited in claim 12, wherein said linking means is configured to link said start of the data packet with the end of packet portion of the previously received packet without any new free pointer being retrieved.

15. A packet buffer as recited in claim 12, wherein said first retrieving means comprises third retrieving means for retrieving free pointers in advance of their actual use and means for keeping the free pointers in reserve in the prefetech memory to even out free pointer usage.

16. A packet buffer as recited in claim 12, wherein said supplying means is configured to maintain write access to the at least one pointer memory to at most one access per clock cycle.

17. A packet buffer as recited in claim 12, wherein said releasing means comprises releasing means for releasing all pointers of a packet to one of said plurality of free pointer queues having a shortest length.

18. A packet buffer as recited in claim 12, further comprising providing means for providing free pointers from the prefetch memory to received data packet elements by reading up to two free pointers from the prefetch memory in each clock cycle.

19. A packet buffer as recited in claim 18, wherein said providing means is configured such that the throughput of read access to the free pointer queue memories is at least once every clock cycle even when the latency of the at least one pointer memory is greater than one clock.

20. A packet buffer as recited in claim 19, wherein said providing means is configured to perform such that a throughput of read access is maintained by reading each free pointer once per cycle from the plurality of free pointer queues in consecutive cycles.

21. A packet buffer as recited in claim 19, wherein a total number of said plurality of free pointer queues is not less than a number of cycles of the latency of the at least one pointer memory.

22. A network device for handling packet data, said network device comprising:
   first storing means for storing free pointers in a plurality of free pointer queues, with each of said plurality free pointer queues in a form of a linked list;
   first retrieving means for retrieving free pointers from each of the plurality of free pointer queues and storing in a prefetch memory to provide a throughput of at least one free pointer per clock cycle;
   receiving means for receiving a data packet at a port in communication with a port interface;
   second retrieving means for retrieving two free pointers from the prefetch memory;
   second storing means for storing a first free pointer of said two free pointers in a start pointer register connoting a start of the data packet and storing a second free pointer of said two free pointers in an assembly linked list;
   supplying means for supplying one free pointer for each middle data element of the data packet, until an end of packet portion is reached;
   linking means for linking said start of the data packet with an end of packet portion of a previously received packet in an output queue memory;
   reading means for reading out a data element of said data packet from said output queue memory when selected by a transmission scheduler and releasing a pointer of the data element to one of said plurality of free pointer queues;
   releasing means for releasing all pointers of a packet to one of said plurality of free pointer queues within one cycle when the packet is dropped; and
   transmitting means for transmitting the data packet to a destination port of the port interface or dropping the data packet;
   wherein said all free pointers linking free queues and all pointers linking data elements reside in at least one pointer memory.

23. A packet buffer for handling packet data, said packet buffer comprising:
   a plurality of free pointer queue memories, configured to supply more than one free pointer;
   a prefetch memory structure, configured to supply up to two free pointer in each clock cycle;
   a plurality of assembly linked lists, configured to store one free pointer in a start pointer register connoting a start of the data packet, and configured to store subsequent portions of the data packet until an end of packet portion is reached;
   at least one output queue memory, configured to link said one free pointer with an end of packet portion of a previously received packet;
   wherein said at least one output queue memory is configured to read out all portions of said data packet from said output queue memory when selected by a transmission scheduler and to release said more than one free pointer to a plurality of free pointer queue memories.

24. A packet buffer as recited in claim 23, wherein said at least one output queue memory is configured to release said more than one free pointer to at least one free pointer queue memory of said plurality of free pointer queue memories having a shortest length of free pointers.

25. A packet buffer as recited in claim 23, wherein said plurality of free pointer queue memories are configured to provide said free pointers in advance of the free pointers being read from the prefetch memory structure.

26. A packet buffer as recited in claim 25, wherein said plurality of free pointer queue memories are configured to provide free pointers to the prefetch memory structure such that read access to the free pointer queue memories is once every clock cycle of a clock used to maintain the timing of the function of the packet buffer whose read latency is greater than one clock cycle.

27. A packet buffer as recited in claim 23, wherein said at least one output queue memory is configured to drop portions of said data packet when the transmission scheduler indicates that the data packet should be dropped.

28. A network device for handling packet data, said network device comprising:
   a port interface, for receiving and transmitting a data packet at ports in communication with a port interface;
   a plurality of free pointer queue memories, configured to supply more than one free pointers;
   a prefetch memory structure, configured to supply up to two free pointer in each clock cycle;
   a plurality of assembly linked lists, configured to store one free pointer in a start pointer register connoting a start of the data packet, and configured to store subsequent portions of the data packet until an end of packet portion is reached;
   at least one output queue memory, configured to link said one free pointer with an end of packet portion of a previously received packet; and
   a packet processing engine, for resolving a destination port for said data packet and for modifying said data packet according to predetermined rules;
   wherein said at least one output queue memory is configured to read out all portions of said data packet from said output queue memory when selected by a transmission scheduler and to release said more than one free pointer to a plurality of free pointer queue memories.

* * * * *